W. HUTCHINGS.
FEEDERS FOR THRASHING-MACHINES.
No. 184,244. Patented Nov. 14, 1876.
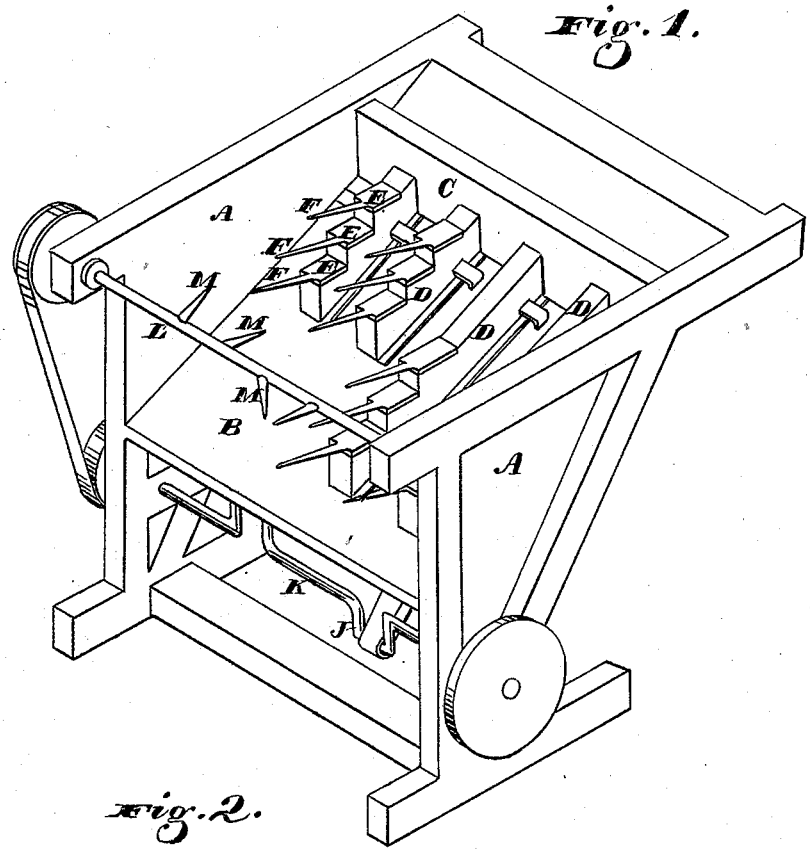
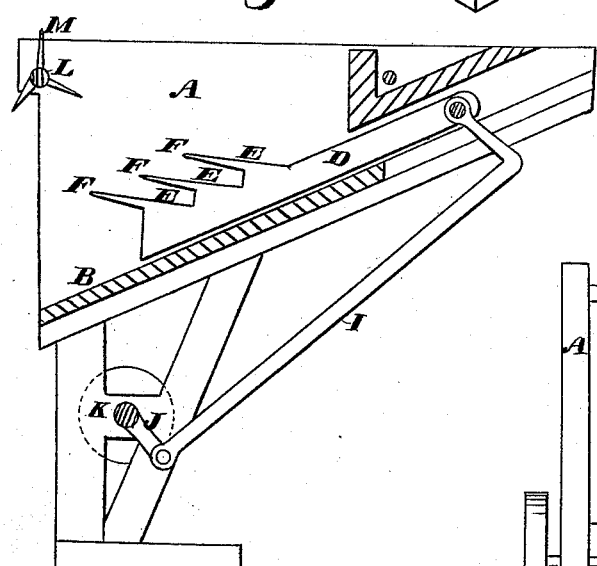
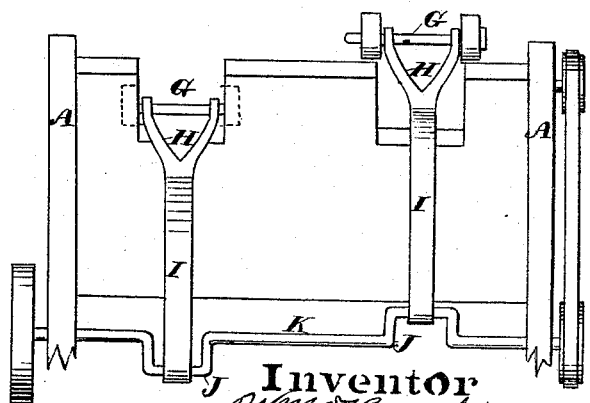
Witnesses
Geo. H. Strong
Alwyn J. Stacy
Inventor
Wm Hutchings
By his Atty's
Dewey & Co.

UNITED STATES PATENT OFFICE.

WILLIAM HUTCHINGS, OF FRESNO, CALIFORNIA.

IMPROVEMENT IN FEEDERS FOR THRASHING-MACHINES.

Specification forming part of Letters Patent No. 184,244, dated November 14, 1876; application filed August 25, 1876.

*To all whom it may concern:*

Be it known that I, WILLIAM HUTCHINGS, of the town and county of Fresno and State of California, have invented an Improved Feeder for Thrashing-Machines; and I do hereby declare the following to be a full, clear, and exact description thereof, reference being had to the accompanying drawing.

My invention relates to an improvement in that class of feeders for thrashing-machines in which reciprocating bars or arms are used, these arms being provided with teeth or projections, and having a reciprocating or curvilinear motion within the trough or chute which leads to the thrashing-cylinder, so as to force the straw forward to the cylinder.

My invention consists in the use of four slides, which are secured together in pairs, having spikes or fingers upon their upper surface. These slide forward and back upon the floor of the incline, one pair upon one side, and the other pair upon the opposite side of the inclined trough, thereby feeding the straw, by a series of alternate movements, at one side and the other of the trough, which is the most important feature of my improvement, as it renders the feeder a success over those which simply employ a series of bars extending across the trough and moving alternately. My bars pass through a vertical partition in the rear, and are connected with operating-cranks from the rear, so that the floor is not perforated and will not waste grain. In combination with this device I employ a series of arms which project from a horizontal shaft just above the mouth of the machine; and these arms are arranged in a spiral form about the shaft, so that one end of the spiral will enter the mass of straw and assist it forward while the slides at the side are being withdrawn, while the end of the spiral will operate as the other pair are withdrawn.

Referring to the accompanying drawings for a more complete explanation of my invention, Figure 1 is a perspective view of my machine. Fig. 2 is a longitudinal section. Fig. 3 is a rear view, showing the attachment of the slides to the pitmen and cranks.

A A are the sides, and B is the bottom, of the incline or trough leading to the thrashing-cylinder. A partition, C, extends across the rear of the trough, and is slotted for the admission of the slides D. These are four in number, and have shoes, if desired, so as to slide easily upon the bottom of the trough. The trough stands at a considerable angle toward the cylinder, and the front ends of the slides have their upper surfaces made into a series of horizontal slips, E, from which the spikes or fingers F project horizontally. The slides pass through the partition C, and behind the partition they are united in two pairs by pins G, and a forked strap, H, connects each of those pairs with the pitman I. The pitmen extend to the cranks J upon the shaft K, which is driven by suitable connecting belts and pulleys. Above the front of the inclined trough is a horizontal shaft, L, which is so connected as to be caused to rotate. This shaft is provided with long arms M, which project from it, and are arranged so as to form one turn of a spiral from one end to the other.

The operation of my machine will then be as follows: The straw is fed into the trough where the slides, with thin fingers F, force it forward, the pair on side serving to move it downward while the other pair are being retracted. The action is a vibrating one, the mass of straw being pushed forward at one end and then at the other. The fingers from their horizontal position are easily withdrawn when the slides are retracted, and never pull the straw back or stop it; and the rotation of the spirally-arranged arms M is so fixed that those in front of each pair of slides will take hold of the straw when the slides are retracted, thus assisting in the feeding.

By operating my slides in two pairs the straw will be easily fed forward, as there is no necessity of pulling it apart and separating the fibers, as would be the case if a system of slides were used and every alternate one moved forward, while the others moved back.

I am aware that feeders have been constructed having reciprocative and serrated arms, said arms moving alternately; and I do not claim such arms, broadly; but What I do claim as new, and desire to secure by Letters Patent, is—

The feeding-slides D united to operate in two pairs upon the inclined bottom B, and provided with fingers F, in combination with the fingers or arms M arranged spirally upon the shaft L, so as to act successively as each pair of slides are retracted, substantially as herein described.

In witness whereof I hereunto set my hand.

WILLIAM HUTCHINGS.

Witnesses:
   GEO. H. STRONG,
   OLWYN T. STACY.